United States Patent [19]

Boehm et al.

[11] Patent Number: 5,095,805
[45] Date of Patent: Mar. 17, 1992

[54] VACUUM BRAKE POWER BOOSTER, IN PARTICULAR FOR MOTOR VEHICLES

[75] Inventors: Peter Boehm, Friedrichsdorf; Wilfried Wagner, Huettenberg-Weiden-hausen; Manfred Rueffer, Sulzbach; Bernd Toepperwien, Rossdorf, all of Fed. Rep. of Germany

[73] Assignee: Alfred Teves GmbH, Frankfurt am Main, Fed. Rep. of Germany

[21] Appl. No.: 518,903

[22] Filed: May 4, 1990

[30] Foreign Application Priority Data

May 10, 1989 [DE] Fed. Rep. of Germany ....... 3915219

[51] Int. Cl.$^5$ .............................................. F15B 9/10
[52] U.S. Cl. ................... 91/369.1; 91/376 R; 91/369.2; 137/627.5; 251/358; 92/42
[58] Field of Search ............... 91/369.1, 376 R, 369.2; 60/547.1, 555; 137/627.5; 251/358; 92/42, 34

[56] References Cited

U.S. PATENT DOCUMENTS

| 4,117,769 | 10/1978 | Carré et al. ........................ 92/42 X |
| 4,622,882 | 11/1986 | Bischoff et al. ..................... 91/369.1 |
| 4,777,868 | 10/1988 | Larsson .................................. 92/42 |
| 4,884,491 | 12/1989 | Endo ................................. 91/376 R |
| 4,885,979 | 12/1989 | Macht et al. ....................... 91/369.1 |
| 4,907,494 | 3/1990 | Gautier et al. .................... 91/376 R |
| 4,953,444 | 9/1990 | Cunningham et al. ........ 91/369.1 X |
| 4,970,940 | 11/1990 | Boehm et al. .................... 91/376 R |

FOREIGN PATENT DOCUMENTS

| 2088677 | 7/1972 | France ................................. 92/42 |
| 0080557 | 7/1981 | Japan .................................. 92/42 |

*Primary Examiner*—Edward K. Look
*Assistant Examiner*—Todd Mattingly
*Attorney, Agent, or Firm*—Robert P. Seitter; J. Gordon Lewis

[57] ABSTRACT

A vacuum brake power booster, in particular for motor vehicles, which includes a poppet valve (12) sealing two valve seats (18, 19) and which is axially deformable within the area of a rolling fold (15) also includes an annular part which is either mounted on the outside of the rolling fold (15) in a form-fit manner or arranged inside the elastic material (24) of the poppet valve (12). This annular part prevents the rolling fold (15) from being blown up outwardly due to the pressure differential prevailing between its two sides so that it will be possible to reduce the return force and thus also the response force.

9 Claims, 2 Drawing Sheets

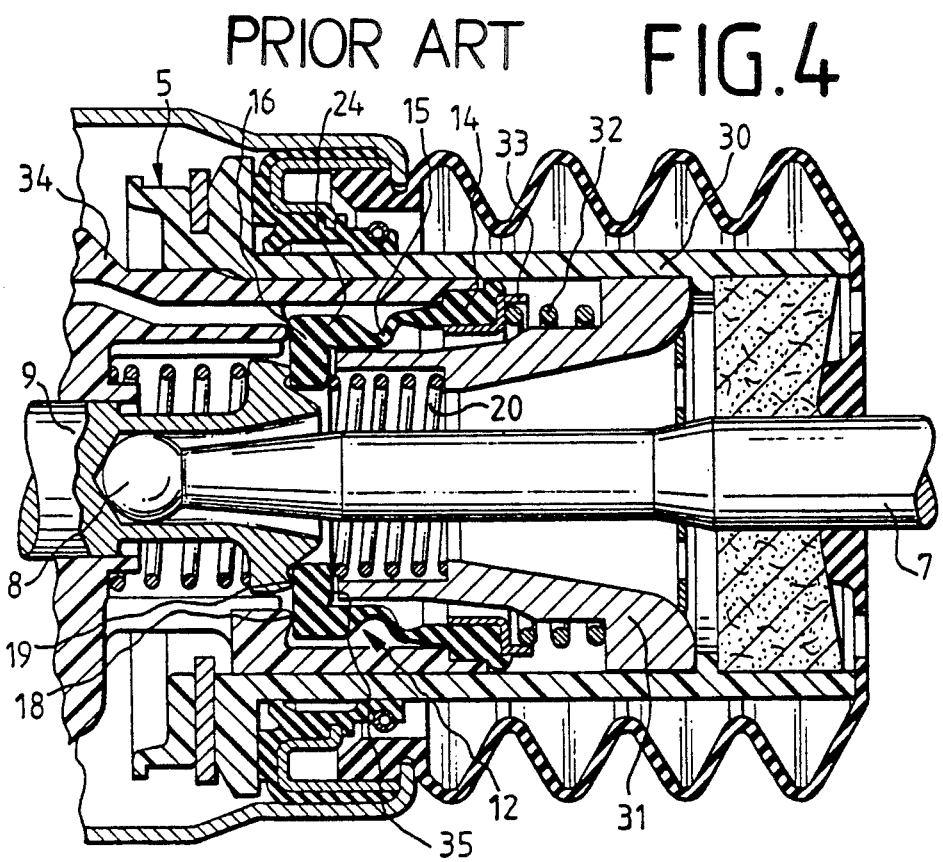
PRIOR ART FIG.4
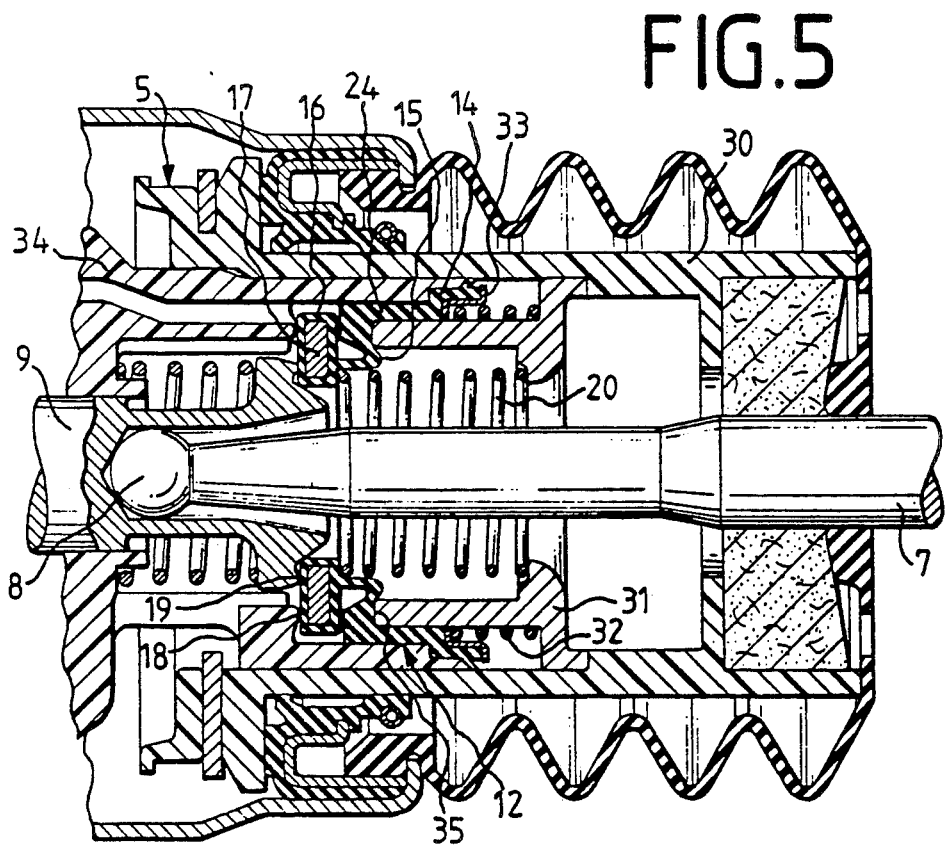
FIG.5

VACUUM BRAKE POWER BOOSTER, IN PARTICULAR FOR MOTOR VEHICLES

TECHNICAL FIELD

The present invention relates to vacuum brake power boosters, in particular for motor vehicles.

BACKGROUND ART

Vacuum brake power boosters used in motor vehicles are, for instance, known from the German printed and published patent application DE-OS 37 09 172. All vacuum brake power boosters comprising a poppet valve with a rolling fold have a problem in common which is that the rolling fold is urged radially outwards due to the pressure differential acting upon it, so that the effective surface upon which the pressure differential acts is enlarged. However, the larger this surface becomes, the more the force reserve of the return force is reduced. On the other hand, however, one endeavors to maintain the difference between response force and return force as small as possible since low response forces with sufficient return forces is an objective.

SUMMARY OF THE INVENTION

It is, therefore, the objective of the present invention to provide a device which serves to prevent the surface of the rolling fold of the poppet valve, which surface is acted upon by the pressure differential, from being enlarged during operation due to the blowing up so that the response force and the return force can be designed as low as possible.

This object is achieved, in accordance with one embodiment of the present invention, by an annular part which is mounted to the outside of the rolling fold of the poppet valve. This annular part maintains the rolling fold in its position in a form-fit manner and prevents it from being blown up.

The annular part is provided, in an advantageous manner, with a circular cross-section and is positioned at that point of the rolling fold where its outside diameter is smallest. In this way, a most favorable rolling behavior of the rolling fold can, in addition, be obtained.

In another form, the annular part is incorporated into the elastic material, with the annular part extending in the rolling fold from the side directed towards the valve seats up to the point where the outside diameter is smallest. The insert is shaped so as to form an integral part with the disc reinforcing the sealing surface. The poppet valve is manufactured such that rubber is injection-molded around the disc with the integral insert.

In an advantageous manner, the annular part can also be designed in the form of a sleeve having the shape of a cone section and abutting onto the outside of the rolling fold. In this arrangement, also, the annular part should extend up to the point where the outside diameter is smallest. In addition, a cylindrical portion which is shaped so as to form an integral part with the sleeve having the shape of a cone section can adjoin the sleeve having the shape of a cone section in the direction of the valve seats. This cylindrical portion can guide the poppet valve and, above all, center the sealing surface. The guide is particularly efficient when the annular part is made of a plastic material.

For a two-part control valve housing known, for example, from the applicants' prior printed and published patent application DE-OS 37 09 172, the present invention provides another advantageous result. In this case, the rolling fold is fixed so far inwards that the abutment of the abutment sleeve can be provided radially outside the fixation point. This is particularly easy when the rolling fold is arranged completely within the abutment sleeve in the inoperative position. In this case, the power flow holding the two control valve housing parts together runs via the sealing seat and the elastic material of the poppet valve, which material is pressed against the sealing seat. Since the abutment sleeve is thus arranged on the outside beside the rolling fold, the latter is prevented from being blown up and its surface upon which the pressure differential acts is always minimal.

BRIEF DESCRIPTION OF THE DRAWINGS

The present invention will be explained by means of the accompanying drawings.

FIG. 4 shows a sectional view of a known design with a two-part control valve housing;

FIG. 5 shows a detailed section of the present invention as applied to a two-part control valve housing.

DETAILED DESCRIPTION OF THE INVENTION

Figure 1:
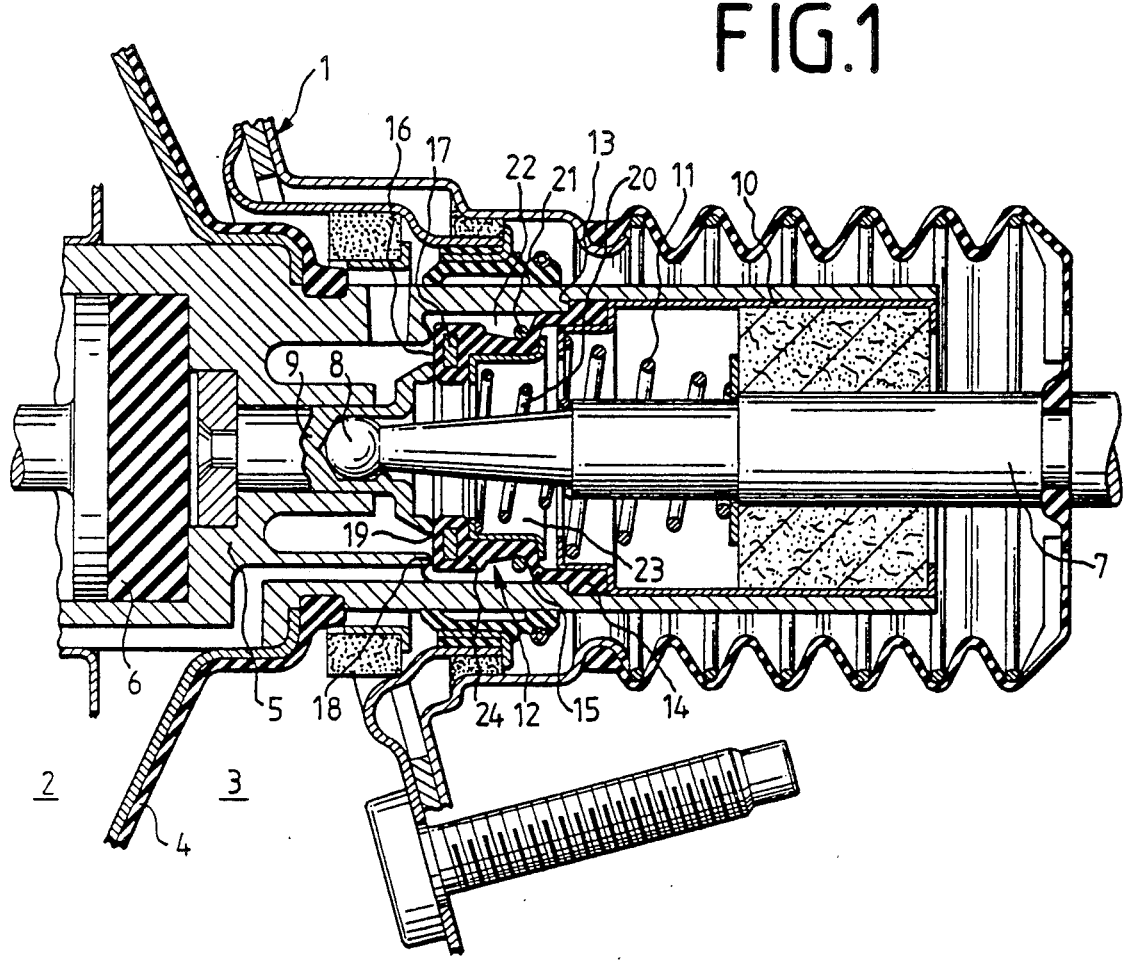
FIG. 1 shows an axial section through a control valve of a vacuum brake power booster.

FIG. 1 shows the booster housing 1 with the vacuum chamber 2 and the working chamber 3 whose pressure is variable. Both chambers are separated from each other by means of the movable wall 4. The tube-shaped control valve housing 5 protruding into the booster housing 1 is connected with the working piston 6 and centers the latter. The piston rod 7 penetrates the control valve housing 5 in the housing center and is actuated directly or indirectly on its one end by the brake pedal, which is not illustrated, and projects with its other ball-shaped end 8 into the control piston 9. A sleeve 10, against which the pressure spring 11 bears and which retains the piston rod 7 in the inoperative position, is inserted into the control valve housing 5. In addition, the sleeve 10 retains the poppet valve 12 against a projection 13 of the control valve housing 5. The poppet valve 12 comprises, in addition to the holding zone 14, the rolling fold 15 and the sealing surface 16 which is reinforced by means of a disc 17. The sealing surface 16 cooperates with the two valve seats 18 and 19 and is urged by means of the poppet valve spring 20 which bears against the piston rod 7 to bear against the valve seats 18, 19.

The annular part 21 which has a circular crosssection is mounted to the outside of the rolling fold 15 and prevents the rolling fold 15 from being outwardly blown up due to the pressure differential prevailing on its two sides.

In the inoperative position, a vacuum 22 exists on the outside of the rolling fold 15 and atmospheric pressure 23 exists on the inside. Without the annular part 21, the elastic material 24 of the rolling fold 15 would be pushed outwardly by means of the pressure differential which would thus act upon a larger surface. The force which is thus increased as well would then require a return force which would be greater than the force necessary with this type of device.

Figure 2:
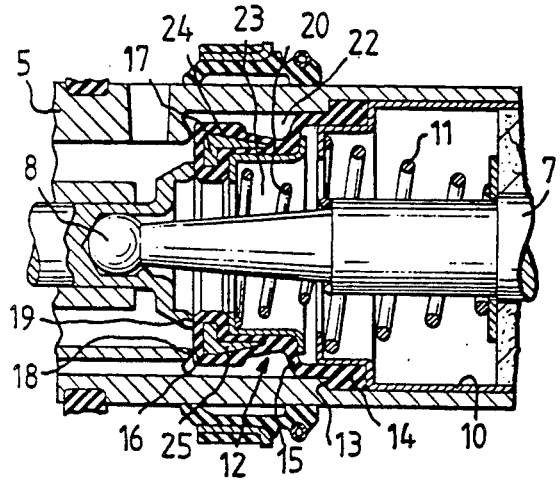
FIG. 2 shows a detailed section with a different design form of the annular part.

FIG. 2 illustrates a section of FIG. 1, the annular part which prevents the rolling fold 15 from being blown up, however, having a different design. Inside the elastic material 24 an insert 25 extends from the disc 17 serving to reinforce the sealing surface 16 up to the point where the outside diameter of the rolling fold 15 is smallest. The insert 25 is shaped so as to form an integral part with the disc 17.

Figure 3:
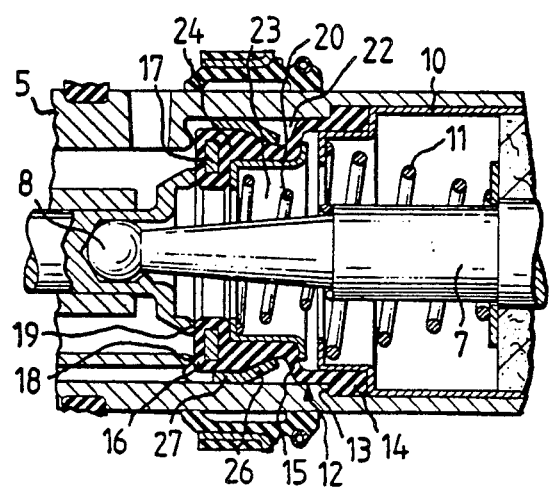
FIG. 3 shows a section as in FIG. 2 with still another design form of the annular part.

FIG. 3 shows a third design variant of the annular part. It is designed in the form of a sleeve 26 having the shape of a cone section which sleeve is seated on the outside of the rolling fold 15 and prevents a blowing up. The sleeve 26, shaped in the form of a cone section, extends up to the point where the outside diameter of the rolling fold 15 is smallest and continues towards the valve seats (18 and 19 in FIG. 1) with a cylindrical portion 27. FIG. 3 shows the same section of FIG. 1 as FIG. 2.

FIG. 4 shows a known design with a two-part control valve housing 5. All parts having the same functions are marked with the same reference numerals as above. The abutment sleeve 31, against which a pressure spring 32 bears, is inserted into the guide part 30 of the control valve housing 5. The pressure spring 32 bears, in addition, against a guide 33 which urges the holding zone 14 of the poppet valve 12 against the front part 34 of the control valve housing 5. The poppet valve spring 20 which preloads the sealing surface 16 against the valve seats 18, 19 also bears against the abutment sleeve 31. Furthermore, the abutment 35 for the rear side of the sealing surface 16 of the poppet valve 12 is arranged at the end of the abutment sleeve 31 which end is on the side of the booster. The abutment 35 is radially arranged in a manner so that it is further inwards than the point where the rolling fold 15 is fixed to the rear side of the sealing surface 16. Therefore, the rolling fold 15 can be blown up outwardly if a corresponding difference exits between the two pressures prevailing on the two sides of the rolling fold.

FIG. 5 provides a detailed illustration of another embodiment or the present invention as applied to a vacuum brake power booster having a two-part control valve housing. It shows that the abutment 35 of the abutment sleeve 31 is arranged radially in a manner so that it is further outwards than the point where the rolling fold 15 is fixed to the rear side of the sealing surface 16. Within the fixing point only does the poppet valve spring 20 bear against the sleeve. In addition to the poppet valve spring 20, another pressure spring 32 also bears against the abutment sleeve 31 in a known manner. Also, the elastic material 24 is pressed against the rear side of the sealing surface 16 by means of the abutment sleeve 31. Furthermore, a part of the poppet valve 12 is guided with little radial play between the abutment sleeve 31 and the front part 34 of the control valve housing 5. Due to the fixation which is arranged very far radially inwardly, a blowing up of the rolling fold 15 towards the outside is unlikely and due to the abutment sleeve 31, which is arranged radially outwardly, is prevented completely.

What is claimed:

1. A vacuum brake power booster comprising:
a vacuum housing sealingly subdivided by a movable wall into a vacuum chamber having a constant pressure and a working chamber having a variable pressure;
and a control valve within said vacuum housing and controllable by a control piston, said control valve having:
   (a) a control valve housing including two telescoping parts, means for axially preloading said two telescoping parts, and an abutment sleeve,
   (b) a first valve seat in said control valve housing,
   (c) a second valve seat in said control valve housing,
   (d) abutting against said abutment sleeve of said control valve housing and including a surface defined by a radially extending section sealing both said first and said second valve seats and an axially deformable rolling fold fixed to said radially extending section radially inward of the abutment of said poppet valve with said abutment sleeve, and
   (e) an annular part positioned to oppose radially outward movement of said rolling fold.

2. A vacuum brake booster according to claim 1 wherein a portion of said rolling fold is pressed by said abutment sleeve against a surface of said radially extending section of said poppet valve opposite said surface which seals said first and said second valve seats.

3. A vacuum brake power booster comprising:
a vacuum housing sealingly subdivided by a movable wall into a vacuum chamber having a constant pressure and a working chamber having a variable pressure;
and a control valve within said vacuum housing and controllable by a control piston, said control valve having:
   (a) a control valve housing,
   (b) a first valve seat in said control valve housing,
   (c) a second valve seat in said control valve housing,
   (d) a poppet valve sealing both said first and said second valve seats and having an axially deformable rolling fold and a disc positioned to reinforce the surface of said poppet valve which seals said first and said second valve seats, and
   (e) an annular part positioned to oppose radially outward movement of said rolling fold and integral with said disc, said annular part extending from said disc to the point where the outside diameter of said rolling fold is smallest.

4. A vacuum brake power booster comprising:
a vacuum housing sealingly subdivided by a movable wall into a vacuum chamber having a constant pressure and a working chamber having a variable pressure;
and a control valve within said vacuum housing and controllable by a control piston, said control valve having:
   (a) a control valve housing,
   (b) a first valve seat in said control valve housing,
   (c) a second valve seat in said control valve housing,
   (d) a poppet valve sealing both said first and said second valve seats and having an axially deformable rolling fold, and
   (e) an annular part positioned to oppose radially outward movement of said rolling fold and having a cone-shaped portion which extends from the point at which the outside diameter of said rolling fold begins to decrease to the smallest outside diameter of said rolling fold.

5. A vacuum brake booster according to claim 4 wherein said annular part further includes a cylindrical portion extending from one end of said cone-shaped portion.

6. A vacuum brake booster according to claim 5 wherein said cylindrical portion extends from the largest diameter end of said cone-shaped portion.

7. A vacuum brake booster according to claim 6 wherein said annular part is a sleeve which extends around the outside of said rolling fold.

8. A vacuum brake power booster comprising:
a vacuum housing sealingly subdivided by a movable wall into a vacuum chamber having a constant pressure and a working chamber having a variable pressure, and
a control valve within said vacuum housing and controllable by a control piston, said control valve having:
 (a) a control valve housing having two telescoping parts,
 (b) a first valve seat in said control valve housing,
 (c) a second valve seat in said control valve housing,
 (d) a poppet valve having a radially extending section defining a surface which seals said first and said second valve seats and having an axially deformable rolling fold which is affixed to said radially extending section,
 (e) means for axially preloading said two telescoping parts, and
 (f) an abutment sleeve against which said poppet valve abuts at a point located radially outward of the point at which said rolling fold is affixed to said radially extending section, thereby serving to oppose radially outward movement of said rolling fold.

9. A vacuum brake booster according to claim 8 wherein a portion of said rolling fold is pressed by said abutment sleeve against a surface of said radially extending section of said poppet valve opposite said surface which seals said first and said second valve seats.

* * * * *